United States Patent
Watari (10) Patent No.: US 9,378,246 B2
(45) Date of Patent: Jun. 28, 2016

(54) SYSTEMS AND METHODS OF ACCESSING DISTRIBUTED DATA

(71) Applicant: Hiromichi Watari, Arlington, MA (US)

(72) Inventor: Hiromichi Watari, Arlington, MA (US)

( * ) Notice: Subject to any disclaimer, the term of this patent is extended or adjusted under 35 U.S.C. 154(b) by 459 days.

(21) Appl. No.: 13/833,339

(22) Filed: Mar. 15, 2013

(65) Prior Publication Data
US 2013/0297646 A1    Nov. 7, 2013

Related U.S. Application Data

(60) Provisional application No. 61/642,382, filed on May 3, 2012.

(51) Int. Cl.
*G06F 17/30* (2006.01)

(52) U.S. Cl.
CPC .... *G06F 17/30477* (2013.01); *G06F 17/30442* (2013.01)

(58) Field of Classification Search
CPC .................. G06F 17/30463; G06F 17/30477; G06F 17/30442
USPC .......................................... 707/713, 718, 769
See application file for complete search history.

(56) References Cited

U.S. PATENT DOCUMENTS

| 4,870,568 | A  | * | 9/1989  | Kahle ............... G06F 17/30445 707/999.005 |
| 5,367,675 | A  | * | 11/1994 | Cheng ............... G06F 17/30451 707/999.002 |
| 6,546,381 | B1 | * | 4/2003  | Subramanian .... G06F 17/30463 707/999.006 |
| 7,010,521 | B2 | * | 3/2006  | Hinshaw ........... G06F 17/30545 707/999.003 |
| 8,244,715 | B2 | * | 8/2012  | Cole ................... G06F 17/3004 707/714 |
| 8,706,973 | B2 | * | 4/2014  | Lee ....................... G06F 9/3004 711/144 |
| 2002/0023069 | A1 | * | 2/2002 | Blank .................. G06F 9/5066 707/999.104 |
| 2011/0047144 | A1 | * | 2/2011 | Han ................... G06F 17/30445 707/718 |
| 2011/0167222 | A1 | * | 7/2011 | Lee ....................... G06F 9/3004 711/118 |

OTHER PUBLICATIONS

Krikellas et al. "Multithreaded Query Execution on Multicore Processors". Very Large Data Base '09, Aug. 24-28, 2009 Lyon, France.

* cited by examiner

*Primary Examiner* — Phong Nguyen
(74) *Attorney, Agent, or Firm* — Lando & Anastasi, LLP (57) ABSTRACT

According to one aspect, a computer system configured to access distributed data is provided. The system comprising a memory including a plurality of data sources, a plurality of processors, and a pattern matching component executed by at least one processor of the plurality of processors and configured to execute a query execution plan using a first processor of the plurality of processors concurrently with a second processor of the plurality of processors, wherein the first processor processes a first data source of the plurality of data sources identified in the query execution plan and the second processor processes a second data source of the plurality of data sources identified in the query execution plan.

29 Claims, 7 Drawing Sheets

SYSTEMS AND METHODS OF ACCESSING DISTRIBUTED DATA

RELATED APPLICATIONS

This application claims priority under 35 U.S.C. §119(e) to U.S. Provisional Application Ser. No. 61/642,382, entitled "SYSTEMS AND METHODS OF ACCESSING DISTRIBUTED DATA," filed on May 3, 2012, which is hereby incorporated herein by reference in its entirety.

BACKGROUND

1. Technical Field

The technical field relates generally to pattern matching and, more particularly, to matching patterns in related data spanning a plurality of data sources.

2. Background Discussion

Conventional data storage and management systems, such as relational database management systems, manage disparate sets of information by consolidating comparable elements into relatively homogeneous tables linked by associations. To reduce data redundancy, many databases employ highly normalized schemas that result in a large numbers of individual tables.

To identify patterns within, and retrieve data from, a database structured according to a normalized schema, database engines are often required to operate on sets of data that include a large number of individual records. To increase efficiency during these operations, many database engines build query execution plans prior to executing data retrieval queries. In building these query execution plans, database engines determine the tables and data conditions required by a submitted query and, based on this information, determine an order in which to access the tables and the access methods to be used. After the query execution plan is complete, typical database engines spawn a process to execute the query execution plan.

SUMMARY

According to at least one embodiment, a system is provided. The system includes a memory, a plurality of processors, and a pattern matching component executed by at least one processor of the plurality of processors. The pattern matching component is configured to execute a data access plan, such as a query execution plan, using a first processor of the plurality of processors and a second processor of the plurality of processors. The first processor processes a first data source identified in the query execution plan. The second processor processes a second data source identified in the query execution plan.

According to one aspect, a computer system configured to access distributed data is provided. The system comprising a memory including a plurality of data sources, a plurality of processors, and a pattern matching component executed by at least one processor of the plurality of processors and configured to execute a query execution plan using a first processor of the plurality of processors concurrently with a second processor of the plurality of processors, wherein the first processor processes a first data source of the plurality of data sources identified in the query execution plan and the second processor processes a second data source of the plurality of data sources identified in the query execution plan.

According to one embodiment, the pattern matching component is configured to execute the query execution plan at least in part by reading the query execution plan, assigning at least one thread to each of the plurality of data sources, and generating a result. According to one embodiment, the pattern matching component is configured to read the query execution plan at least in part by identifying an order in which the plurality of data sources is to be processed, identifying an access method to be used with each data source of the plurality of data sources, and identifying conditions indicating records within each data source of the plurality of data sources that are to be subject to subsequent processing. According to one embodiment, the pattern matching component is configured to assign the at least one thread at least in part by identifying an unassigned data source of the plurality of data sources, reading information descriptive of the unassigned data source, determining an access method for the unassigned data source, and spawning a thread to process the unassigned data source. According to one embodiment, the access method includes at least one of an index-based method and a scan-based method. According to one embodiment, the thread has a type that is selected based on the access method. According to one embodiment, the query execution plan includes instructions to access each record of any of the plurality of data sources. According to one embodiment, the pattern matching component is configured to access data required to execute the query execution plan in-place. According to one embodiment, the pattern matching component is configured to provide a result from execution of the query execution plan to a component that generated the query execution plan. According to one embodiment, the pattern matching component is configured to identify records that meet a condition set associated with the first data source and retrieve specified information from the records for storage in a buffer accessible by the plurality of processors.

According to one aspect, a distributed data access method executed by a computer system including a plurality of processors, the plurality of processors including a first processor and a second processor is provided. The method comprising identifying a plurality of data sources referenced in a query execution plan, the plurality of data sources including a first data source and a second data source, and executing the query execution plan by concurrently processing the first data source using the first processor and the second data source using the second processor.

According to one embodiment, executing the query execution plan includes reading the query execution plan, assigning the at least one thread to each of the plurality of data sources, and generating a result. According to one embodiment, reading the query execution plan includes identifying an order in which the plurality of data sources is to be processed, identifying an access method to be used with each data source of the plurality of data sources, and identifying conditions indicating records within each data source of the plurality of data sources that are to be subject to subsequent processing. According to one embodiment, assigning the at least one thread includes identifying an unassigned data source of the plurality of data sources, reading information descriptive of the unassigned data source, determining an access method for the unassigned data source, and spawning a thread to process the unassigned data source. According to one embodiment, determining the access method includes determining an access method including at least one of an index-based method and a scan-based method. According to one embodiment, spawning the thread includes spawning a thread having a type that is selected based on the access method. According to one embodiment, executing the query execution plan includes executing a query execution plan including instructions to access each record of a data source. According to one embodiment, executing the query execution plan includes accessing data in-place. According to one embodiment, executing the query execution plan includes the act of providing a result from execution of the query execution plan to a component that generated the query execution plan. According to one embodiment, executing the query execution plan includes identifying records that meet a condition set associated with the first data source, and retrieving specified information from the records for storage in a buffer accessible by the plurality of processors.

According to one aspect, a non-transitory computer readable medium having a program stored therein configured to access distributed data, the program being executable by a computer system including a plurality of processors, the plurality of processors including a first processor and a second processor is provided. The program comprising instructions for identifying a plurality of data sources referenced in a query execution plan, the plurality of data sources including a first data source and a second data source, and instructions for executing the query execution plan by processing the first data source using the first processor concurrently with the second data source using the second processor.

According to one embodiment, the instructions for executing the query execution plan include instructions for reading a query execution plan, assigning at least one thread to each of the plurality of data sources, and generating a result. According to one embodiment, the instructions for reading the query plan include instructions for identifying an order in which the plurality of data sources is to be processed, identifying an access method to be used with each data source of the plurality of data sources, and identifying conditions indicating records within each data source of the plurality of data sources that are to be subject to subsequent processing. According to one embodiment, the instructions for assigning the at least one thread include instructions for identifying an unassigned data source of the plurality of data sources, reading information descriptive of the unassigned data source, determining an access method for the unassigned data source, and spawning a thread to process the unassigned data source. According to one embodiment, the instructions for determining the access method include instructions for determining an access method including at least one of an index-based method and a scan-based method. According to one embodiment, the thread has a type that is selected based on the access method. According to one embodiment, the query execution plan includes instructions to access each record of any of the plurality of data sources. According to one embodiment, the instructions for executing the query execution plan include instructions for accessing data in-place. According to one embodiment, the instructions for executing the query execution plan include instructions for providing a result from execution of the query execution plan to a component that generated the query execution plan. According to one embodiment, the instructions for executing the query execution plan include instructions for identifying records that meet a condition set associated with the data source and retrieving specified information from the records for storage in a buffer accessible by the plurality of processors.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Various embodiments disclosed herein includes a number of apparatuses and processes for identifying patterns within data that is distributed within a computer system and retrieving the identified data for further processing. For example, according to one embodiment, a pattern matching component utilizes a plurality of processors to efficiently identify and retrieve information from a plurality of data sources. In this embodiment, the pattern matching component concurrently executes multiple portions of a data access plan, such as a query execution plan, using a plurality of processors disposed within a multi-core processor. In another embodiment, the pattern matching component concurrently executes multiple portions of the data access plan using a plurality of processors in a distributed system. Concurrent execution of at least some of the operations required to identify and retrieve the information results in increased efficiency over conventional query execution processes.

In another embodiment, where the query execution plan includes instructions to access each record of a data source (i.e., perform a "full scan" of the data source), the pattern matching component executes an improved full scan process.

This improved full scan process accesses much of the data required to execute the query in-place (i.e., without copying or moving the data to another storage location). By accessing the data in this manner, the improved full scan process completes full scans of data sources more efficiently than conventional full scan processes.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Data Access System

Figure 1:
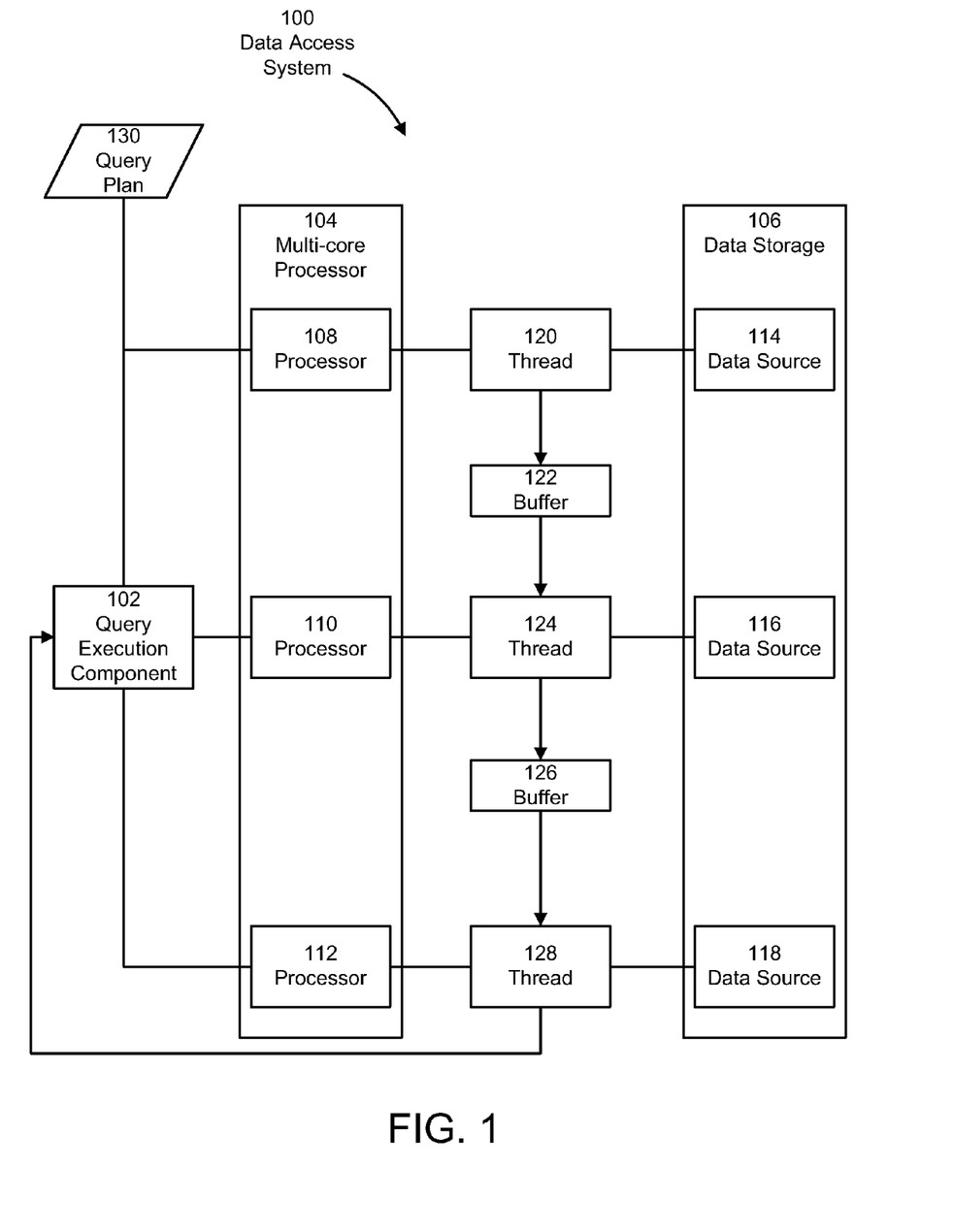
FIG. 1 is a block diagram illustrating logical and physical components of a data management system.

Various embodiments disclosed herein implement a data access system using one or more computer systems. As described further below, the data access system retrieves data from a plurality of data sources using a plurality of processors included within a multi-core processor. FIG. 1 illustrates an exemplary data access system 100. As shown, FIG. 1 includes a pattern matching component 102, a multi-core processor 104, a data storage element 106, threads 120, 124, and 128, buffers 122 and 126, and a query execution plan 130. The multi-core processor 104 may be any of a wide variety of commercially available multi-core processors such as the Adapteva Epiphany, the AMD Phenom II, the Azul Systems Vega 3, the Clearspeed CSX700, and the Intel Polaris. The data storage 106 and the physical media storing the buffers 122 and 126 may include either volatile or non-volatile (non-transitory) media.

In addition, the data storage 106 and the buffers 122 and 126 may include a variety of data structures and data elements that store information to be processed by the data access system 100. For instance, in at least one embodiment, the data sources 114, 116, and 118 are each a relational database table. However, embodiments are not limited to relational databases. Information within the data access system 100, including data within the data storage 106 or the buffers 122 and 126, may be stored in any logical construction capable of holding information on a computer readable medium including, among other structures, file systems, flat files, indexed files, hierarchical databases, relational databases or object oriented databases. In addition, although the example illustrated in FIG. 1 includes three discrete data sources 114, 116, and 118, embodiments are not limited to a particular number of data sources and may include more or less than three data sources.

In addition, although the example illustrated in FIG. 1 includes one multi-core processor 104, embodiments are not limited a single multi-core processor. The multi-core processor 104 may include a plurality of multi-core processors and/or single-core processors in a distributed system. Distributed systems are described further below with reference to FIG. 4.

As illustrated in FIG. 1, the pattern matching component is configured to read the query execution plan 130 and, based on the contents of the query execution plan 130, initiate execution of the threads 120, 124, and 128 via the processors 108, 110, and 112. The query execution plan 130 may include information associating each data source with a set of information to be retrieved from records stored in the data source, an order in which the data source is to be accessed, a manner in which the data source should be accessed, and a discrete set of conditions used to identify records stored in the data source. As described further below, identified records hold information to be used in subsequent processing and may hold information to be included in the result set generated by execution of the query.

To be properly evaluated, a set of conditions associated with a data source may require information from other data sources identified in the query execution plan. In these situations, the order of data sources described in the query plan reflects this dependency, with data sources associated with dependent condition sets falling after the data sources with information upon which the condition sets depend. In the example illustrated by FIG. 1, the query execution plan specifies that the data source 114 be accessed first, the data source 116 be accessed second, and the data source 118 be accessed third.

In addition, according to this example, the query execution plan 130 specifies the condition set associated with the data source 114 be evaluated independently of the other data sources. The exemplary query execution plan 130 also specifies the condition set associated with the data source 116 be evaluated with information retrieved from the data source 114 (i.e., information from records stored in the data source 114 that meet the conditions associated with the data source 114). The exemplary query execution plan 130 also specifies the condition set associated with the data source 118 be evaluated with information retrieved from the data source 114 (i.e., information from records stored in the data source 114 that meet the conditions associated with the data source 114) and information retrieved from the data source 116 (i.e., information from records stored in the data source 116 that meet the conditions associated with the data source 116).

In the illustrated embodiment of FIG. 1, the threads 120, 124, and 128 are configured to concurrently execute as follows. The thread 120 accesses the data source 114 using the access method associated with the data source 114 in the query execution plan 130. In this example, the query execution plan 130 specifies that the data source 114 be accessed via an index. The thread 120 uses the index to identify records within the data source 114 that meet the condition set associated with the data source 114 and retrieves information specified in the query execution plan 130 from the identified records. The thread 120 stores this retrieved information in the buffer 122.

The thread 124 accesses the buffer 122 and accesses the data source 116 using the access method associated with the data source 116 in the query execution plan 130. In this example, the query execution plan 130 specifies that the data source 116 be accessed via a full scan. The thread 124 performs an improved full scan process as described below with reference to FIG. 8 to identify records within the data source 116 that meet the condition set associated with the data source 116. In addition, as part of this improved full scan process, the thread 124 retrieves information specified in the query execution plan 130 from the identified records and stores, in the buffer 126, this retrieved information in association with the information from the buffer 122 used to identify the records from the data source 116.

The thread 128 accesses the buffer 126 and accesses the data source 118 using the access method associated with the data source 118 in the query execution plan 130. In this example, the query execution plan 130 specifies that the data source 118 be accessed via an index. The thread 128 uses the index and the information stored in the buffer 126 to identify records within the data source 118 that meet the condition set associated with the data source 118. The thread 128 retrieves information specified in the query execution plan 130 from the identified records. The thread 128 then provides a result set to the pattern matching component 102. This result set includes the information retrieved from the identified records of the data source 118 in association with the information from the buffer 126 used to identify the records.

In the embodiment illustrated in FIG. 1, the pattern matching component 102 provides the result set to the database engine for subsequent processing. Other exemplary processes performed by the pattern matching component 102 are described further below with reference to FIGS. 5-7.

Figure 2:
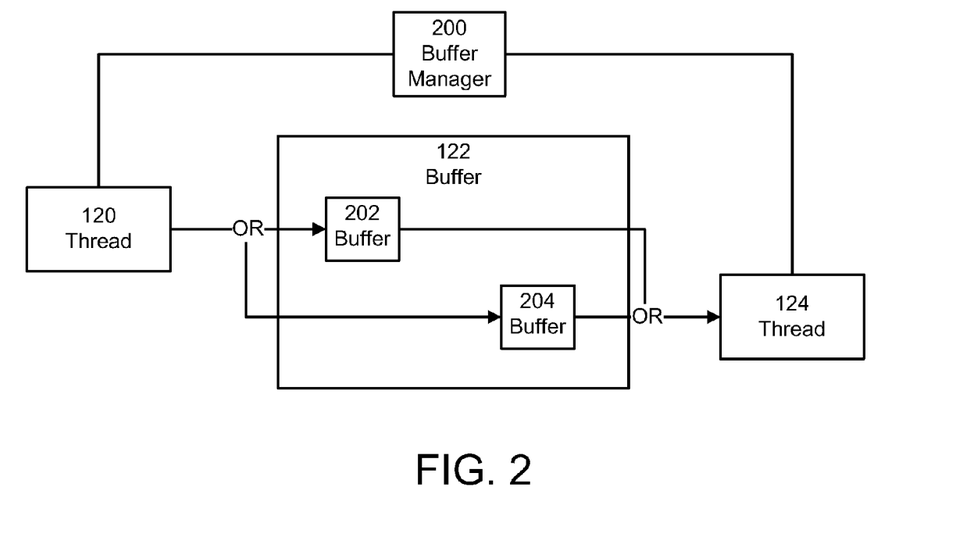
FIG. 2 is a block diagram showing threads and buffers used in one example of the data management system.

In some embodiments, the buffers utilized by the data access system 100, such as the buffers 122 and 126 are subdivided into a plurality of buffers that each hold discrete copies of the data accessed by the threads executing within the data access system 100. FIG. 2 illustrates an example in which the buffer 122 is subdivided into two buffers 202 and 204 that are managed by a buffer manager 200. According to this example, the thread 120 writes information to the buffer 202 and the thread 124 reads information from the buffer 204. By utilizing separate buffers, each of the threads 120 and 124 are free to work with discrete copies of the same information, thereby reducing contention for buffering resources and increasing execution speed.

In some embodiments, the buffer manager 200 alternates buffer assignments in response to a request from a thread executing on the data access system 100. For instance, in one embodiment, the thread 120 writes information to the buffer 202 until the amount of information written equals a predetermined threshold (e.g., the storage capacity of the buffer 202) or until the thread 120 has finished processing the data source 114. Responsive to the threshold being exceeded or the completion of processing of the data source 114 by the thread 120, the thread 120 issues a request to the buffer manager 200 for an empty buffer. Concurrent to the execution of the thread 120, the thread 124 reads information from the buffer 204 until a threshold amount of information remains unread (e.g., no unread information). Responsive to this threshold being met, the thread 124 issues a request to the buffer manager 200 for a buffer filled with new data. Responsive to receipt of the request from the thread 120 and receipt of the request from the thread 124, the buffer manager 200 reassigns the buffer 204 to the thread 120 and reassigns the buffer 202 to the thread 124.

Figure 3:
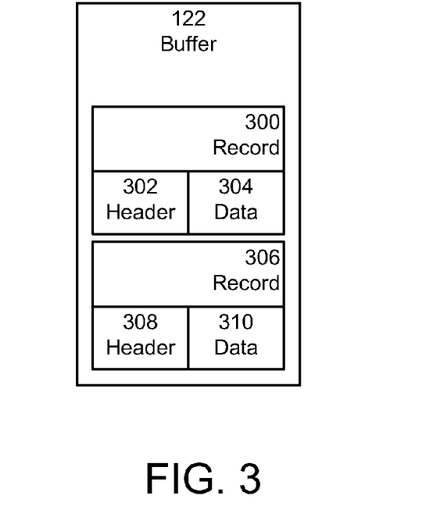
FIG. 3 is a block diagram depicting the data structure of an exemplary buffer used in the data management system.

In other embodiments, the threads 120 and 124 store information in the buffer 122 and the buffer 126 within a data structure organized to increase the speed with which the threads 124 and 128 process records including variable length fields. FIG. 3 illustrates the buffer 122 organized according to one of these embodiments. As shown in FIG. 3, the buffer 122 includes two records 300 and 306. The record 300 includes a header 302 and data 304. The record 306 includes a header 308 and data 310. In the embodiment illustrated in FIG. 3, the headers 302 and 308 include location information that points directly to the beginning locations of each data field disposed within the data 304 and 310, respectively. By referencing the location information included in the headers 302 and 308, the thread 124 can directly access each data field within the data 304 and 310. In this way, the thread 124 is not required to sequentially scan the data 304 and 310 to find information needed for processing.

Information may flow between the components illustrated in FIGS. 1-3, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Embodiments disclosed herein are not limited to the particular configuration illustrated in FIGS. 1-3. Various embodiments may implement the components described above using a variety of hardware components, software components and combinations of hardware and software components. For example, in one embodiment the pattern matching component 102 may be implemented as a software component, while in another embodiment the pattern matching component 102 may be implemented as an application-specific integrated circuit. In addition, various embodiments may utilize additional components configured to perform the processes and functions described herein. For instance, in at least one embodiment, the data access system 100 is implemented using a computer system such as one of the computer systems described below with reference to FIG. 4.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 4:
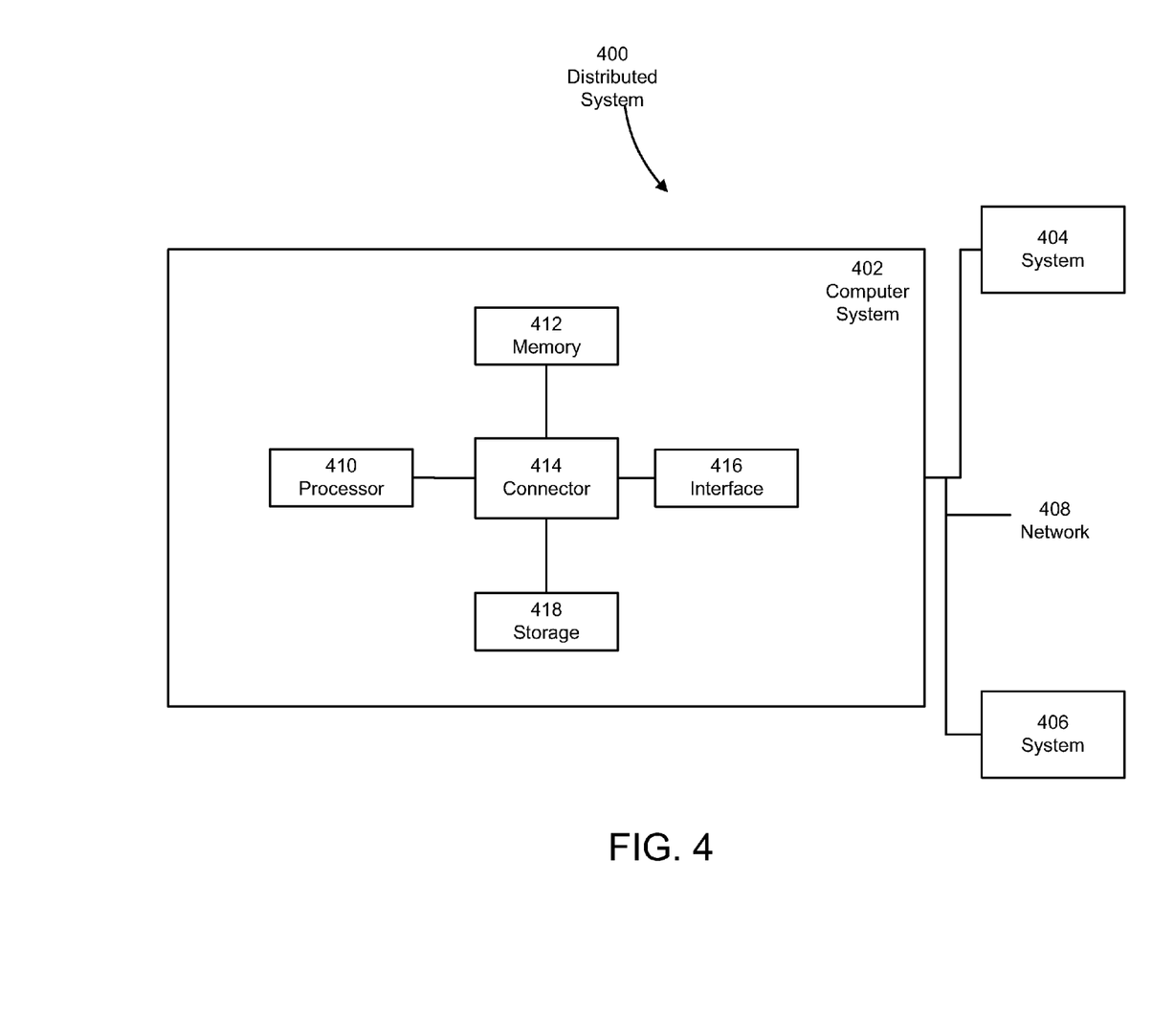
FIG. 4 is a schematic diagram of one example of a computer system that may perform processes and functions disclosed herein.

Referring to FIG. 4, there is illustrated a block diagram of a distributed computer system 400, in which various aspects and functions are practiced. As shown, the distributed computer system 400 includes one more computer systems that exchange information. More specifically, the distributed computer system 400 includes computer systems 402, 404 and 406. As shown, the computer systems 402, 404 and 406 are interconnected by, and may exchange data through, a communication network 408. The network 408 may include any communication network through which computer systems may exchange data. To exchange data using the network 408, the computer systems 402, 404 and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 402, 404 and 406 may transmit data via the network 408 using a variety of security measures including, for example, TLS, SSL or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, a connector 414, an interface 416 and data storage element 418. To implement at least some of the aspects, functions and processes disclosed herein, the processor 410 performs a series of instructions that result in manipulated data. The processor 410 may be any type of processor, multiprocessor or controller. Some exemplary processors include commercially available processors such as an Intel Xeon, Itanium, Core, Celeron, or Pentium processor, an AMD Opteron processor, an Apple A5, a Sun UltraSPARC or IBM Power5+ processor and an IBM mainframe chip. The processor 410 is connected to other system components, including one or more memory devices 412, by the connector 414.

The memory 412 stores programs and data during operation of the computer system 402. Thus, the memory 412 may be a relatively high performance, volatile, random access memory such as a dynamic random access memory ("DRAM") or static memory ("SRAM"). However, the memory 412 may include any device for storing data, such as a disk drive or other non-volatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the connector 414. The connector 414 may include one or more physical busses, for example, busses between components that are integrated within a same machine, but may include any communication coupling between system elements including specialized or standard computing bus technologies such as IDE, SCSI, PCI and InfiniBand. The connector 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage element 418 includes a computer readable and writeable nonvolatile, or non-transitory, data storage medium in which instructions are stored that define a program or other object that is executed by the processor 410. The data storage element 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage element 418. The memory may be located in the data storage element 418 or in the memory 412, however, the processor 410 manipulates the data within the memory, and then copies the data to the storage medium associated with the data storage element 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having a different architectures or components than that shown in FIG. 4. For instance, the computer system 402 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Data Access Processes

Figure 5:
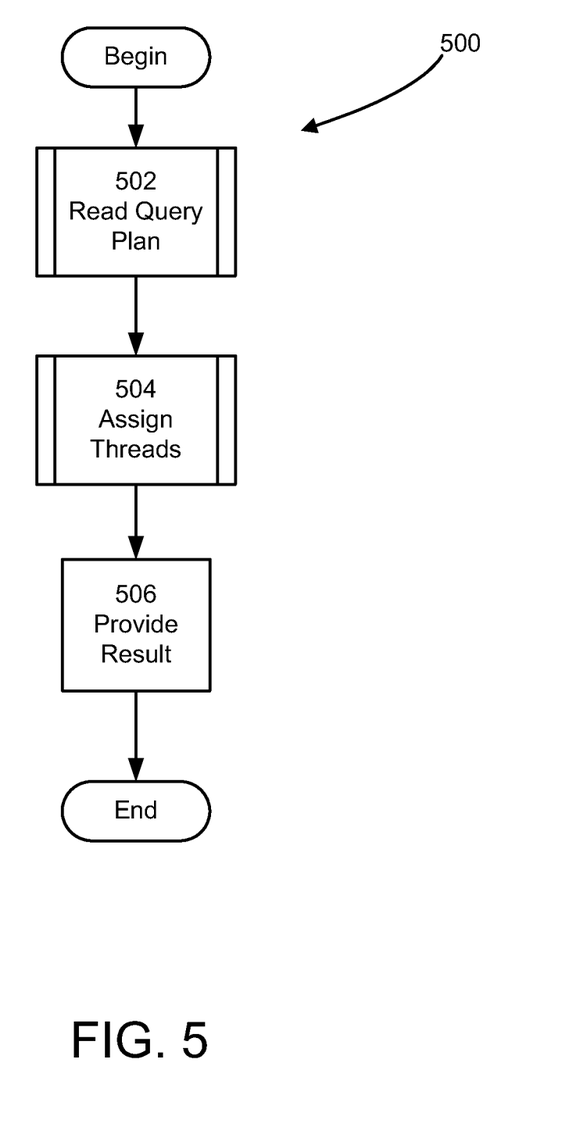
FIG. 5 is a flow diagram illustrating a process of identifying and retrieving data from a plurality of data sources.

As explained above, some embodiments perform processes that provide access to distributed information stored within a computer system, such as the data access system 100. One example of such a data access process is illustrated in FIG. 5. According to this example, the data access process 500 includes several acts of reading a query execution plan, executing a plurality of threads, and providing a result set.

Figure 6:
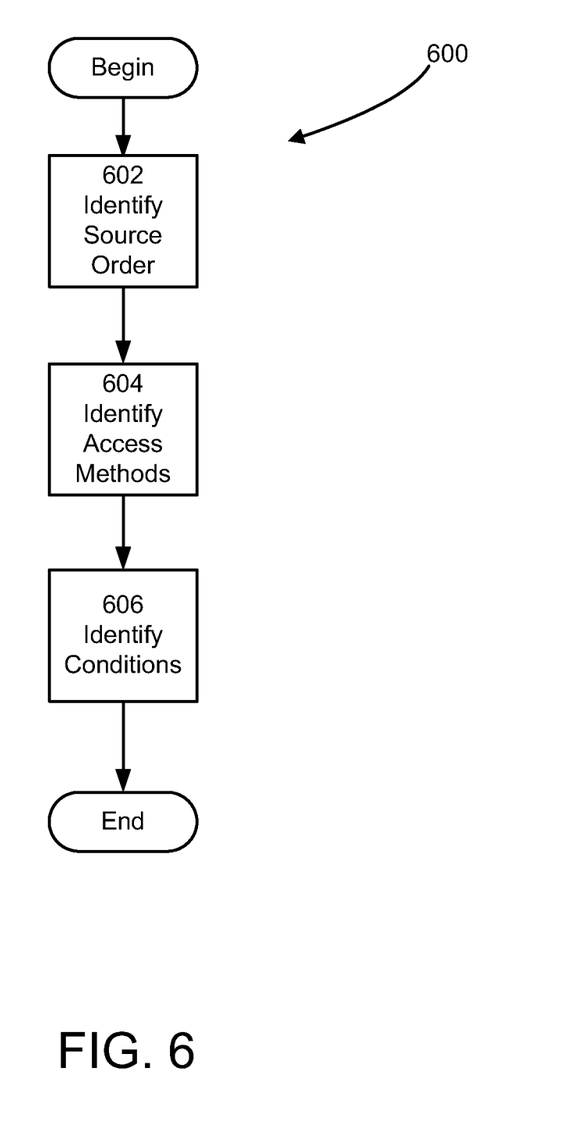
FIG. 6 is a flow diagram illustrating a process of reading information from a query execution plan.

In act 502, a data access plan, such as the query execution plan described above with reference to FIG. 1, is read. In one embodiment, a pattern matching component, such as the pattern matching component described above with reference to FIG. 1, reads the data access plan. FIG. 6, which is described further below, illustrates an exemplary process performed during execution of the act 502.

Figure 7:
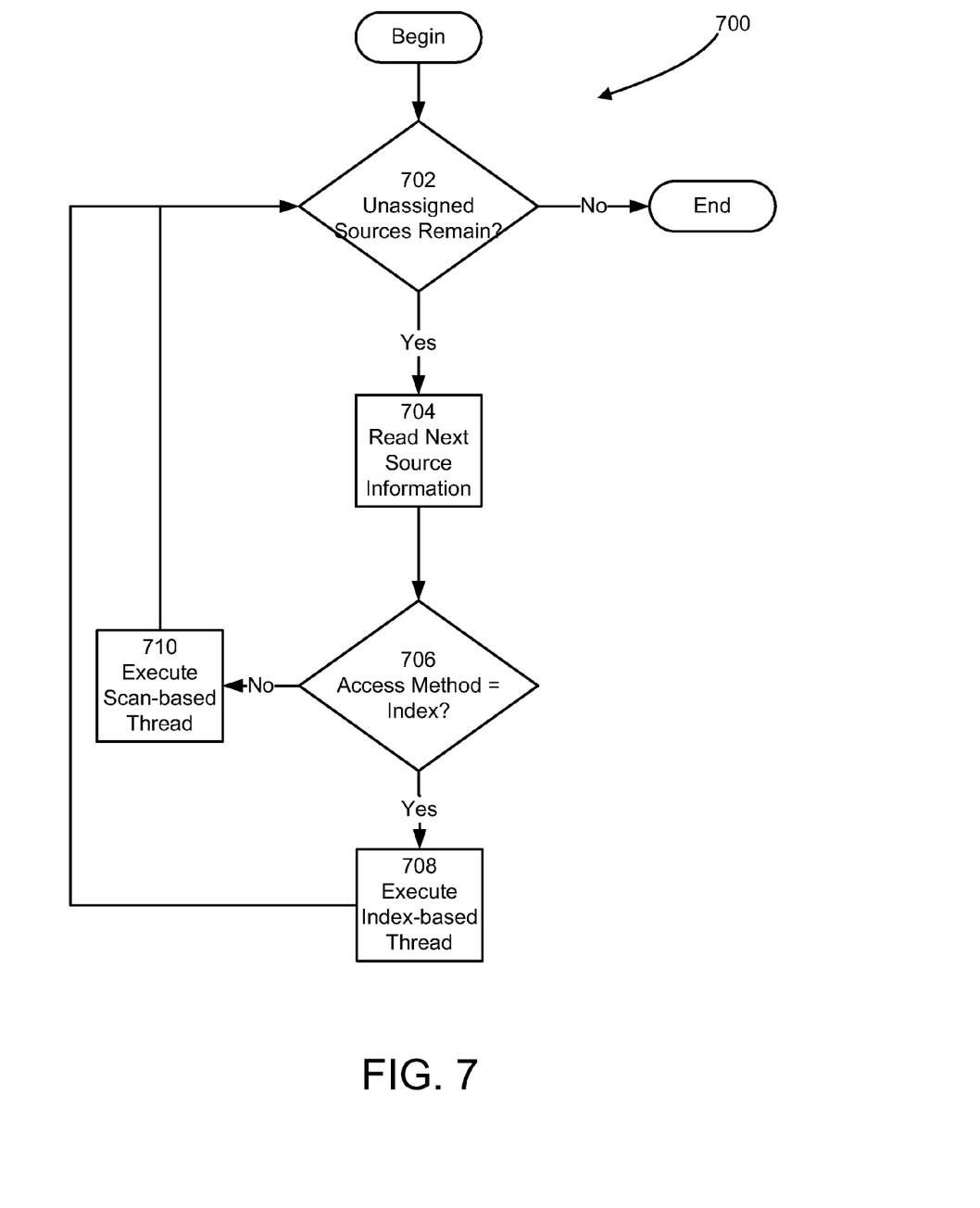
FIG. 7 is a flow diagram illustrating a process of executing threads that collaborate to identify and retrieve data requested in a query.

In act 504, a plurality of threads is instantiated and assigned to execute the data access plan. In one embodiment, the pattern matching component concurrently executes the plurality of threads. FIG. 7, which is described further below, illustrates an exemplary process performed during execution of the act 504.

In act 506, a set of information resulting from execution of the data access plan is provided. In some embodiments, the pattern matching component provides the result set to the component that generated the data access plan. In one embodiment directed toward relational databases, the pattern matching component provides the result set to the database engine that generated the query execution plan. Upon completion of the act 506, the pattern matching component terminates the data access process 500.

Processes such as the data access process 500 enable faster identification and access to distributed data than conventional, single-threaded processes.

As described above with reference to the act 502, some embodiments perform processes that read query execution plans. One example of such a plan reading process is illustrated in FIG. 6. According to this example, the plan reading process 600 includes acts of identifying an order in which data sources are to be processed, identifying an access method to be used with each data source, and identifying conditions indicating records with a data source are to be subject to subsequent processing.

In act 602, an order in which data sources are to be processed is identified. In one embodiment, a pattern matching component, such as the pattern matching component 102 described above with reference to FIG. 1 identifies the order contained within a query execution plan, such as the query execution plan 130 described above with reference to FIG. 1.

In act 604, the pattern matching component identifies a distinct data access method for each data source specified in the query execution plan. In act 606, the pattern matching component identifies conditions that must be met by records within each data source for the records to be included in subsequent processing. Upon completion of the act 606, the query execution process terminates execution of the plan reading process 600.

Processes such as the plan reading process 600 enable pattern matching components to determine the information required to execute a query using concurrently executing threads.

As described above with reference to the act 504, some embodiments perform processes that assign a plurality of threads to execute a query execution plan. One example of such a thread assignment process is illustrated in FIG. 7. According to this example, the thread assignment process 700 includes several acts which are described further below.

In act 702, a pattern matching component, such as the pattern matching component 102 described above with reference to FIG. 1, determines whether any data sources within a query execution plan, such as the query execution plan 130 described above with reference to FIG. 1, remain without a thread assigned to process the data source. If not, the pattern matching component terminates the thread assignment process 700. Otherwise, in act 704 the pattern matching component reads information descriptive of the next, unassigned data source in the order described in the query execution plan.

In act 706, the pattern matching component determines whether the access method associated with the next, unassigned data source is an index-based access method. If so, the pattern matching component executes an index-based thread, such as the thread 120 described above with reference to FIG. 1, on the next available processor within a multi-core processor, such as the multi-core processor 104 described above with reference to FIG. 1. Otherwise, the pattern matching component executes a scan-based thread, such as the thread 124 described above with reference to FIG. 1, on the next available processor within the multi-core processor. In addition, the multi-core processor may include a plurality of multi-core processors and/or single core processors in a distributed system.

Processes such as the thread assignment process 700 enable pattern matching components to initiate concurrent, multi-thread processing of queries.

Figure 8:
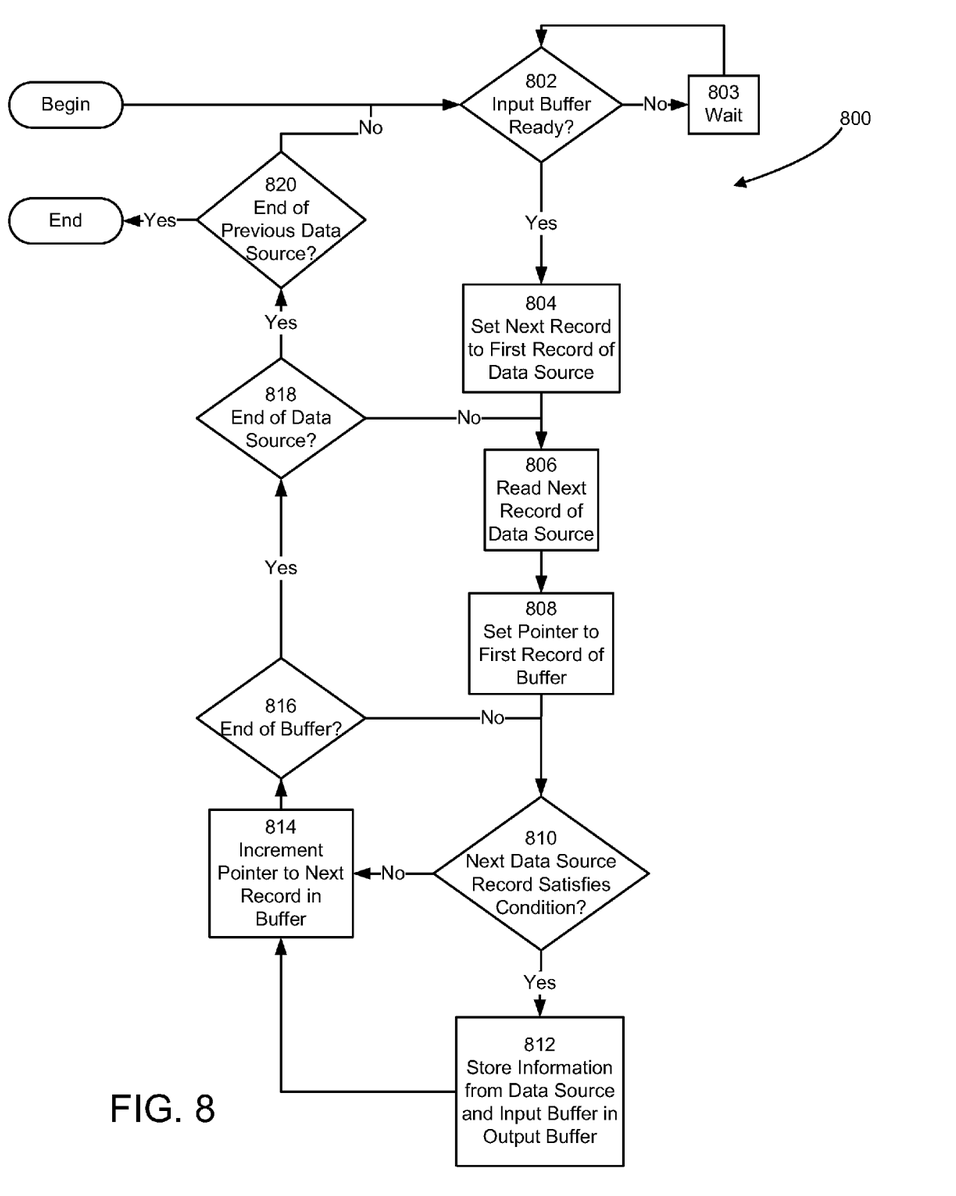
FIG. 8 is a flow diagram illustrating a process of executing an improved full scan process.

As described above with reference to the FIG. 1, some embodiments perform an improved full scan process. One example of such a full scan process is illustrated in FIG. 8. According to this example, the full scan process 800 includes several acts which are described further below.

In act 802, a scan-based thread, such as the thread 124 described above with reference to FIG. 1, determines whether an input buffer, such as the buffer 122 described above with reference to FIG. 1, is ready for processing (e.g., is either filled with data or processing of the previous data source is complete). If not, the scan-based thread waits predetermine period of time in act 803. Otherwise, the scan-based thread sets the next record of the data source being scanned, such as the data source 116 described above with reference to FIG. 1, to the first record of the data source in act 804.

In act 806, the scan-based thread reads the next record of the data source. In act 808, the scan-based thread sets a pointer to the first record of the input buffer. In act 810, the scan-based thread determines whether the next record of the data source satisfies the condition set associated with the data source. If so, in act 812, the scan-based thread retrieves information from the record pointed to in the input buffer (i.e., without restoring the record from the input buffer to the previous data source) and from the next record of the data source and stores the retrieved information in an output buffer, such as the buffer 126 described above with reference to FIG. 1. Otherwise, the scan-based thread executes act 814.

In the act 814, the scan-based thread increments the pointer to the next record in the input buffer. In the act 816, the scan-based thread determines whether the end of the input buffer has been reached. If not, the scan-based thread executes the act 810. Otherwise, the scan-based thread determines whether the end of the data source being scanned has been reached in act 818. If not, the scan based thread executes the act 806. Otherwise, the scan-based thread determines whether a thread feeding the input buffer, such as the thread 120 described above with reference to FIG. 1, has completed its processing. If so, the scan-based thread terminates the full scan process 800. Otherwise, the scan-based thread executes the act 802.

Processes such as the full scan process 800 enable threads to complete full scans of data sources more rapidly than conventional full scan processes, which restore data stored in processing buffers to the data source prior to processing subsequent data sources.

Processes 400 through 800 each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely a data access system configured according to the examples and embodiments disclosed herein.

Having thus described several aspects of at least one embodiment, it is to be appreciated that various alterations, modifications, and improvements may be implemented therein. For instance, while portions of this disclosure relate to embodiments that work within a relational database system to execute a query execution plan, embodiments disclosed herein are not limited to pattern matching within a relational database system and may be used in other contexts to execute various types of data access plans. In addition, while some embodiments are implemented using multi-core processors, other embodiments may be implemented using a plurality of single core processors and/or multi-core processors. Such alterations, modifications, and improvements are intended to be part of this disclosure, and are intended to be within the scope of the embodiments discussed herein. Accordingly, the foregoing description and drawings are by way of example only.

What is claimed is:

1. A computer system configured to access distributed data comprising:
   a memory including a plurality of tables in at least one relational database;
   a plurality of processors including a first processor and a second processor;
   at least one buffer; and
   a pattern matching component executed by at least one processor of the plurality of processors and configured to execute a query execution plan using the first processor concurrently with the second processor at least in part by identifying an order in which the plurality of tables is to be processed, identifying an access method to be used with each table of the plurality of tables, and identifying conditions indicating records within each table of the plurality of tables that are to be subject to subsequent processing, wherein the first processor is configured to process a first table of the plurality of tables identified in the query execution plan and store a portion of retrieved information in the at least one buffer and wherein the second processor is configured to process a second table of the plurality of tables identified in the query execution plan and the portion of retrieved information in the at least one buffer.

2. The computer system as claimed in claim 1, wherein the pattern matching component is configured to execute the query execution plan at least in part by assigning at least one thread to each of the plurality of tables and generating a result.

3. The computer system as claimed in claim 2, wherein the pattern matching component is configured to assign the at least one thread at least in part by identifying an unassigned table of the plurality of tables, reading information descriptive of the unassigned table, determining an access method for the unassigned table, and spawning a thread to process the unassigned table.

4. The computer system as claimed in claim 3, wherein the access method includes at least one of an index-based method and a scan-based method.

5. The computer system as claimed in claim 4, wherein the thread has a type that is selected based on the access method.

6. The computer system as claimed in claim 1, wherein the query execution plan includes instructions to access each record of any of the plurality of tables.

7. The computer system as claimed in claim 6, wherein the pattern matching component is configured to access data required to execute the query execution plan in-place.

8. The computer system as claimed in claim 1, wherein the pattern matching component is configured to provide a result from execution of the query execution plan to a component that generated the query execution plan.

9. The computer system as claimed in claim 1, wherein the pattern matching component is configured to identify records that meet a condition set associated with the first table and retrieve specified information from the records for storage in a buffer accessible by the plurality of processors.

10. A distributed data access method executed by a computer system including a plurality of processors, the plurality of processors including a first processor and a second processor, the method comprising:
   identifying a plurality of tables in at least one relational database referenced in a query execution plan, the plurality of tables including a first table and a second table; and
   executing the query execution plan by concurrently processing the first table using the first processor and the second table using the second processor, wherein executing the query execution plan includes identifying an order in which the plurality of tables is to be processed, identifying an access method to be used with each table of the plurality of tables, identifying conditions indicating records within each table of the plurality of tables that are to be subject to subsequent processing, processing the first table by the first processor, storing a portion of the retrieved information in the at least one buffer by the first processor, and processing the second table and the portion of retrieved information in the at least one buffer by the second processor.

11. The distributed data accessing method as claimed in claim 10, wherein executing the query execution plan includes assigning the at least one thread to each of the plurality of tables and generating a result.

12. The distributed data accessing method as claimed in claim 11, wherein assigning the at least one thread includes identifying an unassigned table of the plurality of tables, reading information descriptive of the unassigned table, determining an access method for the unassigned table, and spawning a thread to process the unassigned table.

13. The distributed data accessing method as claimed in claim 12, wherein determining the access method includes determining an access method including at least one of an index-based method and a scan-based method.

14. The distributed data accessing method as claimed in claim 13, wherein spawning the thread includes spawning a thread having a type that is selected based on the access method.

15. The distributed data accessing method as claimed in claim 10, wherein executing the query execution plan includes executing a query execution plan including instructions to access each record of a table.

16. The distributed data accessing method as claimed in claim 15, wherein executing the query execution plan includes accessing data in-place.

17. The distributed data accessing method as claimed in claim 10, wherein executing the query execution plan includes the act of providing a result from execution of the query execution plan to a component that generated the query execution plan.

18. The distributed data accessing method as claimed in claim 10, wherein executing the query execution plan includes:
   identifying records that meet a condition set associated with the first table; and
   retrieving specified information from the records for storage in a buffer accessible by the plurality of processors.

19. A non-transitory computer readable medium having a program stored therein configured to access distributed data, the program being executable by a computer system including a plurality of processors and at least one buffer, the plurality of processors including a first processor and a second processor, the program comprising:
   instructions for identifying a plurality of tables in at least one relational database referenced in a query execution plan, the plurality of tables including a first table and a second table; and
   instructions for executing the query execution plan by processing the first table using the first processor concurrently with the second table using the second processor, wherein the instructions for executing the query execution plan include instructions to identify an order in which the plurality of tables is to be processed, identify an access method to be used with each table of the plurality of tables, identify conditions indicating records within each table of the plurality of tables that are to be subject to subsequent processing, process the first table by the first processor, store a portion of the retrieved information in the at least one buffer by the first processor, and process the second table and the portion of retrieved information in the at least one buffer by the second processor.

20. The non-transitory computer readable medium as claimed in claim 19, wherein the instructions for executing the query execution plan include instructions for assigning at least one thread to each of the plurality of tables and generating a result.

21. The non-transitory computer readable medium as claimed in claim 20, wherein the instructions for assigning the at least one thread include instructions for identifying an unassigned table of the plurality of tables, reading information descriptive of the unassigned table, determining an access method for the unassigned table, and spawning a thread to process the unassigned table.

22. The non-transitory computer readable medium as claimed in claim 21, wherein the instructions for determining the access method include instructions for determining an access method including at least one of an index-based method and a scan-based method.

23. The non-transitory computer readable medium as claimed in claim 22, wherein the thread has a type that is selected based on the access method.

24. The non-transitory computer readable medium as claimed in claim 19, wherein the query execution plan includes instructions to access each record of any of the plurality of tables.

25. The non-transitory computer readable medium as claimed in claim 24, wherein the instructions for executing the query execution plan include instructions for accessing data in-place.

26. The non-transitory computer readable medium as claimed in claim 19, wherein the instructions for executing the query execution plan include instructions for providing a result from execution of the query execution plan to a component that generated the query execution plan.

27. The non-transitory computer readable medium as claimed in claim 19, wherein the instructions for executing the query execution plan include instructions for identifying records that meet a condition set associated with the table and retrieving specified information from the records for storage in a buffer accessible by the plurality of processors.

28. A computer system configured to access distributed data comprising:
   a memory including a plurality of tables in at least one relational database;
   a plurality of processors including a first processor and a second processor;

at least one buffer; and a pattern matching component executed by at least one processor of the plurality of processors and configured to execute a query execution plan using the first processor concurrently with the second processor at least in part by identifying an unassigned table of the plurality of tables, reading information descriptive of the unassigned table, determining an access method for the unassigned table, and spawning a thread to process the unassigned table, wherein the first processor is configured to process a first table of the plurality of tables identified in the query execution plan and store a portion of retrieved information in the at least one buffer and wherein the second processor is configured to process a second table of the plurality of tables identified in the query execution plan and the portion of retrieved information in the at least one buffer.

29. A computer system configured to access distributed data comprising:

a memory including a plurality of tables in at least one relational database;

a plurality of processors including a first processor and a second processor;

at least one buffer; and a pattern matching component executed by at least one processor of the plurality of processors and configured to execute a query execution plan including instructions to access each record of any of the plurality of tables using the first processor concurrently with the second processor at least in part by accessing data required to execute the query execution plan in-place, wherein the first processor is configured to process a first table of the plurality of tables identified in the query execution plan and store a portion of retrieved information in the at least one buffer and wherein the second processor is configured to process a second table of the plurality of tables identified in the query execution plan and the portion of retrieved information in the at least one buffer.

* * * * *